United States Patent [19]

Mator et al.

[11] 3,894,419

[45] July 15, 1975

[54] MOISTURE ANALYZER CALIBRATOR

[75] Inventors: Richard T. Mator, Plum Borough; Thomas J. Puzniak, Cheswick, both of Pa.

[73] Assignee: Gulf Research & Development Company, Pittsburgh, Pa.

[22] Filed: June 19, 1974

[21] Appl. No.: 480,681

[52] U.S. Cl. ................................................. 73/1 R
[51] Int. Cl. ............................................. G01c 25/00
[58] Field of Search ........................... .............. 73/1 R

[56] References Cited
UNITED STATES PATENTS

| | | | |
|---|---|---|---|
| 3,521,865 | 7/1970 | Kertzman | 73/1 R |
| 3,614,855 | 10/1971 | Van Luik, Jr. | 73/1 R |
| 3,665,748 | 5/1972 | Mator | 73/1 R |
| 3,776,023 | 12/1973 | Budd et al. | 73/1 R |

OTHER PUBLICATIONS

Cram, L. A., "An Apparatus for Producing Air of Controlled Relative Humidity for Hygrometer Calibration and Testing," Journal of Scientific Instruments, 7–1956, pgs. 273–276.

*Primary Examiner*—Richard E. Aegerter
*Assistant Examiner*—Richard R. Stearns

[57] ABSTRACT

Apparatus and a method for calibration of moisture analyzers including means to pass separate streams of a dry gas and a wet gas into a mixer. The wet gas stream is passed through a saturator maintained at a constant temperature to maintain a constant vapor pressure of moisture in the wet stream. Each of the dry gas and the wet gas is passed through a flow restrictor that makes the flow rate of each of the gas streams depend on the pressure differential through the restrictors. A first pressure regulating valve maintains a constant pressure at the inlets of the two flow restrictors and a second pressure regulating valve maintains a constant pressure at the outlet of the mixer.

12 Claims, 1 Drawing Figure

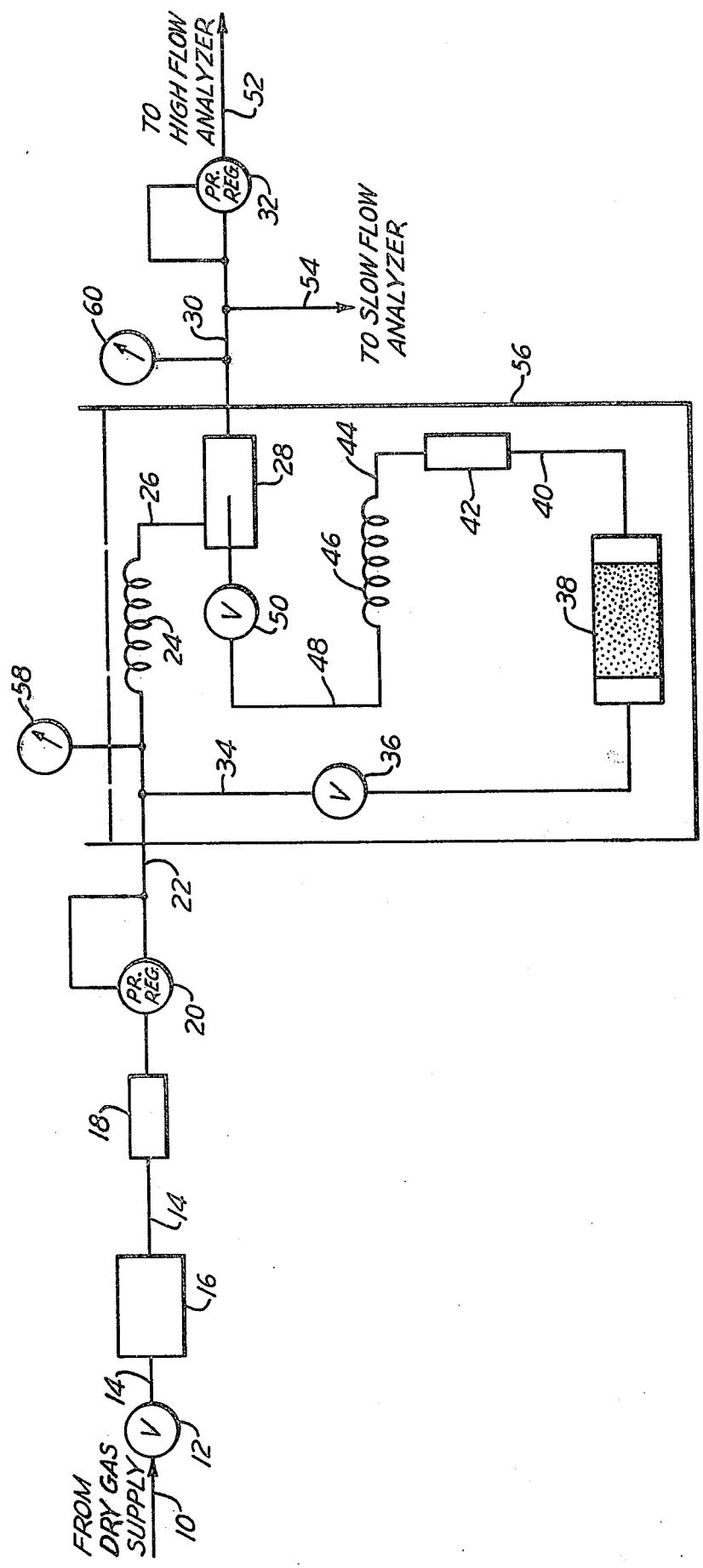

MOISTURE ANALYZER CALIBRATOR

This invention relates to the measurement of the moisture content of liquid and gas streams and more particularly to a method and apparatus for calibration of on-line moisture analyzers.

The control and measurement of trace water in process operations is important for several reasons, such as improving the life of catalysts used in the process, control of the quality of the product, and optimization of the process. Several different types of instruments have been developed for monitoring small amounts of water in process streams. One type of instrument known as the electrolytic hygrometer measures the current consumed to electrolyze the moisture in a sample stream. Another type of instrument uses reaction chromatography for measurement of the moisture. A third type of instrument utilizes the change in oscillating frequency of piezoelectric crystals which occurs upon the absorption of moisture by the crystals to indicate the moisture content of a sample stream. Each of the instruments requires periodic calibration to correct for drift and provide an accurate indication of the moisture content in the stream, particularly when the moisture is in low concentrations ranging from a few parts per million up to approximately 25,000 parts per million.

In U.S. Pat. No. 3,665,748 of Richard T. Mator, a method and apparatus for calibration of moisture analyzers is described. The method, in general, resides in the addition to a dry gas of a wet gas having a known concentration of moisture and delivering the resulting gas mixture of known moisture content to the instrument that is to be calibrated. A formula is developed in U.S. Pat. No. 3,665,748 for the calculation of the water concentration in the gas mixture. The apparatus described in the patent provides means for varying each of four parameters independently of the other three to give a wide range of moisture concentrations in the gas mixture that is delivered to the moisture analyzers for calibration of the moisture analyzers. Control of the calibration apparatus has been found to be difficult and requires the services of a skilled technician.

In most instances, it is not essential to the calibration of a moisture analyzer that several points on its calibration curve be obtained. It is an object of this invention to provide a simple single point calibration method and apparatus that will not require manipulation to adjust conditions in the calibration device nor require the services of a skilled technician.

This invention resides in apparatus for the calibration of moisture analyzers in which a dry gas and a wet gas of carefully controlled composition are delivered to a mixer and the mixture is delivered to the moisture analyzers for calibration of the moisture analyzers. The dry gas at a known and regulated pressure is passed through a restrictor into the mixer. The wet gas is prepared by passing a slip stream of the dry gas at the known and regulated pressure at which the dry gas is delivered to the flow restrictor through a water saturator and then through a flow restrictor before delivery into the mixer. A back pressure regulator in the discharge line from the mixer controls the pressure in the mixer and thereby the pressure drop through the flow restrictors to fix the rate of flow of the several streams into the mixer.

The single FIGURE of the drawings is a diagrammatic illustration of the apparatus used in this invention for calibration of moisture analyzers.

Referring to the drawing, a dry gas is supplied from a source, not shown, through supply line 10 equipped with a valve 12. The dry gas may come from any suitable source. For example, if the moisture analyzer calibrator is to be used with the DuPont 510 Analyzer, which uses the change in the frequency of a vibrating crystal, to indicate the moisture content of a gas flowing into contact with the crystal, the dry gas source may be the dry reference gas from the DuPont Analyzer. Another suitable source of dry gas is cylinder gas with provisions to pass the gas discharged from the cylinder through a suitable drier such as a heatless drier or molecular sieve.

An inlet line 14 from the dry gas source connects a surge tank 16, a micron filter 18 and a pressure regulating valve 20 in that order. Surge tank 16 minimizes fluctuations in the pressure flowing to the moisture analyzer calibration device. Pressure regulating valve 20 is adapted to maintain the pressure on the outlet side of the valve at a constant pressure. A pressure gauge 58 is connected into a dry gas line 22 from the outlet of the pressure regulating valve to the inlet end of a restrictor 24. As illustrated in the drawing, restrictor 24 is a coil of capillary tubing. A preferred restrictor is a coil of stainless steel tubing having an opening approximately 0.01 inch in diameter extending through it, but restrictors of other types, such as orifice plates, can be used. The micron filter 18 has small openings, for example 60 microns in diameter, to remove particles that might otherwise plug the restrictor.

The outlet end of restrictor 24 is connected by line 26 into a mixing chamber 28. Mixing chamber 28 is preferably a baffled container having inlets for dry gas and wet gas and an outlet for the mixed gas. The outlet of the mixing chamber 28 is connected by a line 30 to a pressure regulating valve 32 adapted to maintain a constant pressure on the inlet side of that regulating valve.

Connected into line 22 between the pressure regulating valve 20 and the restrictor 24 is a dry gas line 34 having a valve 36 in it. The dry gas line 34 continues from the outlet of valve 36 to the inlet of a saturator 38. Saturator 38 may be of the type illustrated in U.S. Pat. No. 3,665,748 containing a wet sponge through which the gas delivered into the separator must pass. A wet gas line 40 from the outlet of the saturator 38 is connected to the inlet of a micron filter 42. The outlet of filter 42 is connected by line 44 to the inlet of a wet gas restrictor 46. Wet gas restrictor 46 is preferably an elongated, for example 9 feet long, coil of stainless steel capillary tubing having an opening therethrough with a diameter of approximately 0.01 inch. Filter 42 is adapted to remove particles that might plug restrictor 46. A 60 micron filter is suitable. Like restrictor 24, restrictor 46 may be another type of structure such as an orifice plate or a packed column. It is only important that the restrictor cause substantially the entire pressure drop in the wet gas line from its junction with line 22 to the outlet in the mixer 28. A wet gas line 48 connected to the outlet of restrictor 46 has a valve 50 in it between the outlet of the restrictor 46 and the outlet of line 48 within mixer 28.

A calibration gas line 52 from the outlet of pressure regulating valve 32 extends to a high-flow type moisture analyzer such as the DuPont 510 Analyzer. An outlet line 54 connected into line 30 between the mixer 28 and pressure regulating valve 32 serves as a bypass around valve 32 or can be connected to a moisture analyzer such as a slow flow type analyzer.

The entire wet gas flow system, including the saturator 38, filter 42, restrictor 46 and mixer 28 are maintained at a constant temperature during the operation of the calibration device. A preferred means for maintaining the necessary constant temperature is an ice bath containing wet ice and, therefore, adapted to maintain a constant temperature of 32° F. Such an ice bath is indicated in the drawing by the reference numeral 56. Restrictor 24 and lines 22 and 26 in the dry gas system are also enclosed within the ice bath 56.

In the operation of the constant temperature calibration device illustrated in the drawing, the constant temperature will ordinarily be maintained at 32° F. by wet ice. Then, the moisture content of the wet gas delivered through line 48 into the mixer 28 will be dependent solely on the pressure in the saturator 38. The moisture content of the wet gas in parts per million equals:

$$\frac{P_{H_2O}}{P_{SAT}} \times 10^6,$$

where
$P_{H_2O}$ is the partial pressure of water at the temperature of the bath, and $P_{SAT}$ is equal to the absolute pressure within the saturator.

Because the temperature of bath 56 is constant, $P_{H_2O}$ will remain constant and will equal 0.08857 psi when the bath and saturator are maintained at 32° F. Because the pressure drop through valve 36 is negligible, $P_{SAT}$ will be indicated by the pressure gauge 58 connected into line 22.

The rates of flow of both the dry gas and wet gas to mixer 28 are proportional to the pressure drop from line 22 to the mixer. Small changes in the pressure drop from pressure gauge 58 to gauge 60 do not significantly cause any change in the ratio of dry gas to wet gas flowing to the mixer. Because the saturator is maintained at a constant temperature, and therefore $P_{H_2O}$ remains constant, the concentration of moisture in the wet gas from the saturator, and consequently in the gas discharged to the mixer 28 is determined solely by the pressure on the saturator.

The concentration of moisture in the gas discharged from the mixture for a given bath temperature is dependent not only on the pressure of the dry gas delivered to the saturator but also on the relative flow rates of the dry gas and the wet gas delivered to the mixer. Those rates can be varied as required for the production of a gas of a particular moisture content by changing the flow characteristics of the two restrictors. Such changes are part of the design of the apparatus for the production of a gas having a specific desired moisture content and are made before the apparatus is installed for calibration of a moisture analyzer. Normally, the calibration device itself is calibrated before installation by setting the pressure regulators, separately passing dry gas and wet gas through the device and measuring the flow rates of the wet gas and the dry gas individually as they are discharged from the mixer. Setting of the pressure regulating valves will be made at the time of installation of the apparatus for delivery of the moisture analyzers to be calibrated. Normally, no adjustment of the regulating valves will be required other than to maintain the desired indicated pressures at gauges 58 and 60. However, if a change in the moisture content of the gas delivered to the moisture analyzer is desired to calibrate the moisture analyzer at a different moisture content that may be closer to the normal operating range of the moisture analyzer, some change can be easily made by adjustment of the pressure regulating valve 20, otherwise the length of one of the restrictors must be altered.

In the use of the moisture analyzer calibration apparatus, the bath 56 containing the saturator 38 and the restrictor coils 24 and 46 is filled with wet ice. The dry gas supply 10 is connected with a suitable source of dry gas. If the analyzer to be calibrated is a "high-flow" type, such as the DuPont 510 Analyzer, line 54 is suitably blocked and line 52 is opened to deliver gas to a suitable vent adjacent the analyzer. Valves 36 and 50 are closed to isolate the saturator from the dry gas system and valve 12 is opened. Dry gas flows through the dry gas portion of the apparatus and out through line 52 to purge moisture from that part of the apparatus. Presure regulating valve 20 is adjusted to maintain the preselected pressure designed to produce a gas of the desired moisture content to be delivered to the moisture analyzer. Typically, pressure regulating valve 20 will be set to maintain a pressure of 45 psig. Pressure regulating valve 32 is adjusted to maintain a pressure of, for example, 10 psig to provide a gas containing 20 parts per million of moisture.

After purging, which may required two to three hours, the gas flowing through line 52 is switched from the vent to the moisture analyzer. After a short period, the analyzer response should be nil. Then, valves 36 and 50 are slowly opened to cause gas to flow through the saturator 38, restrictor 46, and into the mixer 28. Valves 36 and 50 are ball-type valves which are fully open during operation of the calibrator and cause insignificant pressure drop in the gas flowing through them. In less than thirty minutes, the DuPont 510 Analyzer will indicate the moisture content of the gas delivered to it from the calibrator. That gas not delivered to the low-flow analyzer is vented through line 52 in order to maintain a constant flow through the blender at all times as controlled by valve 32.

The moisture content of the gas discharged from the mixer is engineered for the specific moisture analyzer to be calibrated. The moisture content can vary from as low as 5 parts per million to 1,000 parts per million or more. The apparatus of this invention is most effectively used in the calibration of moisture analyzers used to monitor streams containing less than 100 parts per million moisture.

If the calibration apparatus of this invention is used to calibrate a "slow-flow" type of moisture analyzer, such as an analyzer of the electrolytic cell type, flow is maintained through line 52 to a vent and also through line 54 during the purging. During purging, the rate of flow through line 54 is adjusted to the rate specified by the manufacturer of the analyzer, and the purging continued until the analyzer indicates 0–1 ppm of moisture. Then, valves 36 and 50 are opened and blended wet gas delivered through line 54 to the analyzer. Because of the low flow rate, approximately one hour may be required to reach equilibrium conditions and obtain a final reading on the analyzer. While wet gas is delivered to the low flow analyzer, flow is continued through line 52 to maintain a constant flow through the mixer at all times, as controlled by valve 32.

The apparatus is simple and highly accurate in blending a wet gas and a dry gas to produce a gas having a known concentration of moisture in parts per million that is useful in calibrating moisture analyzers. While the apparatus is designed to produce a gas having a single moisture content, that single point can be selected for most effective calibration of a particular moisture analyzer by adjustment of the pressure, or by selection of restrictors to control the relative flow rates of wet and dry gas to the mixer.

Ordinarily, the method and apparatus of this invention are used to produce a desired moisture content in a gas such as air or nitrogen. They can be used to produce other mixtures of gases such as a mixture of one hydrocarbon in another. For example, the method and apparatus can be used to produce a known concentration of pentane in methane. Use of the method for such gases may require use of means to control the temperature of the saturator at other than 32° F. Temperatures other than 32° F. can be used for the production of gases having a known moisture content, but maintaining the saturator at 32° F. is preferred because of the ease with which it can be done.

We claim:

1. A method of preparing a gas of known moisture content comprising regulating the pressure on a dry gas, flowing dry gas at the regulated pressure into a flow restrictor, discharging the dry gas from the flow restrictor and delivering said gas into a mixer, delivering a stream of dry gas at the regulated pressure to a saturator maintained at a constant temperature to form a wet gas, passing the wet gas from the saturator through a flow restrictor and into the mixer, and maintaining a constant pressure on the gas in the mixer.

2. A method as set forth in claim 1 including the step of controlling the moisture content of the gas in the mixer by control of the regulated pressure on the dry gas.

3. A method as set forth in claim 1 in which the temperature of the saturator is approximately 32° F.

4. A method as set forth in claim 3 including the step of maintaining the temperature of both restrictors at approximately 32° F.

5. A method of preparing a mixture of a first gas having a desired concentration of a fluid therein comprising regulating the pressure on the first gas to maintain a constant pressure, flowing the first gas at the regulated constant pressure into a first flow restrictor, delivering the first gas discharged from the first flow restrictor into a mixer, flowing a stream of the first gas at the regulated constant pressure into a saturator maintained at a constant temperature at which the fluid is liquid under the regulated constant pressure, said saturator having therein the fluid in the liquid state whereby the first gas passing therethrough is substantially saturated with the fluid in the gaseous state, flowing a mixture of the first gas and the fluid in the gaseous state from the saturator through a second flow restrictor and into the mixer, maintaining a constant pressure on the gas in the mixer, and changing the regulated pressure on the first gas to adjust the concentration of the fluid in the first gas to the desired concentration.

6. Apparatus for preparing a gas of known moisture content comprising means for supplying a dry gas, pressure regulating means for maintaining a constant inlet pressure on the dry gas, dry gas flow restricting means, gas mixing means, conduit means for delivering dry gas from the pressure regulating means to the flow restricting means and from the flow restricting means to the mixing means, saturating means, means for delivering dry gas from the dry gas pressure regulating means into the saturating means to form a wet gas, wet gas flow restrictor means, wet gas conduit means adapted to deliver wet gas from the saturating means to the wet gas restrictor means and from the wet gas restrictor means to the mixing means, temperature control means adapted to maintain the saturating means at a constant temperature, and second pressure regulating means adapted to maintain a constant pressure on the gas in the mixing means.

7. Apparatus as set forth in claim 6 in which the dry gas flow restricting means and the wet gas flow restricting means are elongated sections of capillary tubing.

8. Apparatus as set forth in claim 6 in which the dry gas flow restricting means and the wet gas flow restricting means are elongated sections of capillary stainless steel tubing having an opening therethrough of approximately 0.01 inch in diameter.

9. Apparatus as set forth in claim 6 in which the temperature control means is an ice bath.

10. Apparatus as set forth in claim 9 in which the dry gas flow restricting means and the wet gas flow restricting means are submerged in the ice bath.

11. Apparatus as set forth in claim 6 in which the first pressure regulating means is a pressure regulating valve in the conduit and controls the pressure to the dry gas flow restricting means and the saturator whereby said pressure can be changed to change the moisture content of the gas discharged from the mixing means.

12. Apparatus as set forth in claim 6 in which the saturator is a water-soaked sponge supported between the inlet and the outlet of the saturator to direct dry gas through the sponge.

* * * * *